(12) United States Patent
Tautenhahn et al.

(10) Patent No.: US 11,493,408 B2
(45) Date of Patent: Nov. 8, 2022

(54) MICROTOME

(71) Applicant: Leica Biosystems Nussloch GmbH, Nussloch (DE)

(72) Inventors: Dirk Tautenhahn, Solms (DE); Karl-Heinrich Westerhoff, Eppingen (DE); Markus Woll, Dannstadt-Schauernheim (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 321 days.

(21) Appl. No.: 16/930,407

(22) Filed: Jul. 16, 2020

(65) Prior Publication Data

US 2021/0018404 A1 Jan. 21, 2021

(30) Foreign Application Priority Data

Jul. 18, 2019 (DE) ...................... 10 2019 119 514.4

(51) Int. Cl.
| | |
|---|---|
| *G01N 1/06* | (2006.01) |
| *G06K 7/14* | (2006.01) |
| *G06K 19/06* | (2006.01) |
| *G06V 10/10* | (2022.01) |

(52) U.S. Cl.
CPC ............ *G01N 1/06* (2013.01); *G06K 7/1413* (2013.01); *G06K 7/1417* (2013.01); *G06K 19/06028* (2013.01); *G06K 19/06037* (2013.01); *G01N 2001/061* (2013.01); *G06V 10/10* (2022.01); *G06V 2201/09* (2022.01)

(58) Field of Classification Search
CPC .. G01N 1/06; G01N 2001/061; G06K 7/1413; G06K 7/1417; G06K 19/06009

USPC .............. 235/462.13, 462.43, 462.1, 462.01
See application file for complete search history.

(56) References Cited

U.S. PATENT DOCUMENTS

| | | | | | |
|---|---|---|---|---|---|
| 3,699,830 | A | * | 10/1972 | Pickett | ................. A61B 17/322 83/13 |
| 3,884,563 | A | * | 5/1975 | Evans | ...................... G01N 1/06 352/121 |
| 5,821,115 | A | | 10/1998 | Graupner | |
| 2009/0235799 | A1 | * | 9/2009 | Thiem | .................. B26D 7/2614 83/651 |
| 2014/0033888 | A1 | * | 2/2014 | Walker | ..................... G01N 1/06 83/698.11 |

FOREIGN PATENT DOCUMENTS

| | | | |
|---|---|---|---|
| DE | 102013106023 A1 | 12/2014 | |
| WO | WO-2016016795 A1 * | 2/2016 | ............... G01N 1/06 |

OTHER PUBLICATIONS

Fujii, Tomoyuki, "Application of the 'NT-Cutter' Knife Blade To Microtome Sectioning of Wood," IAWA Journal, vol. 24, No. 3, 2003, pp. 241-245.

PFM Medical AG, pfm medical Quality and Experience (company catalog), Jan. 2017, Germany.

\* cited by examiner

*Primary Examiner* — Paultep Savusdiphol
(74) *Attorney, Agent, or Firm* — Hodgson Russ LLP

(57) ABSTRACT

A microtome has a sectioning apparatus that comprises a microtome blade, for sectioning histological samples into thin prepared sections. The microtome is characterized in that an optical reading apparatus is present which reads an optically readable image pattern on the microtome blade, generates analog or digital image signals corresponding to the read image pattern and conveys the image signals to a control apparatus of the microtome.

34 Claims, 4 Drawing Sheets

MICROTOME

CROSS REFERENCE TO RELATED APPLICATION

This application claims priority of German patent application number 10 2019 119 514.4 filed Jul. 18, 2019, the entire disclosure of which is incorporated by reference herein.

FIELD

The disclosure relates to a microtome having a sectioning apparatus that comprises a microtome blade, for sectioning histological samples into thin prepared sections.

The disclosure also relates to a microtome blade.

BACKGROUND

Histological samples taken from a patient pass through a plurality of treatment steps in various treatment stations in a histology laboratory before they can be investigated, for example using a microscope.

When histological samples are prepared in the context of an embedding process for subsequent microtomy, the samples are firstly fixed utilizing a fixing medium, for example formalin. Tissue liquid present in the sample is then removed. This is accomplished in several steps by treating it with alcohol of increasing purity. In order to bring the samples, after such treatment, into a state that permits sectioning by means of a microtome, an embedding medium—for example, paraffin, gelatin, agar, nitrocellulose, polyester wax, polyethylene glycol, or plastic—is infiltrated into the samples. During the aforementioned processes, the samples are usually present in a cassette that comprises a plurality of sieve-like openings so that the chemicals can flow around the samples. A particular embodiment of such a cassette is known, for example, from DE 43 33 118 A1.

After infiltration of the embedding medium, the samples can be removed from their cassette and block-embedded in paraffin. The block can then be sectioned, using a microtome, into thin sections that are placed individually onto specimen slides. The thin sections can then be stained for microscopic investigation.

Microtomes are usually used to produce thin sections of histological samples. Microtomes usually comprise a knife holder for a disposable blade; a worn-out blade is usually discarded, in particular after a specific number of sectioning operations, and is replaced by a new disposable microtome blade. A knife holder for a microtome is known, for example, from DE 10 2004 051 974 A1.

U.S. Pat. No. 3,699,830 discloses a rotary microtome. The rotary microtome comprises a microtome blade holder that is embodied for releasable reception of a disposable blade.

DE 10 2012 213 824 A1 discloses a knife holder having a blade-changing apparatus for a microtome. With this knife holder, a used microtome blade no longer needs to be pushed, by a new microtome blade, out of the blade receptacle of the sectioning position. Instead it can be conveyed by gravity, for instance can fall, slide, or slip out, into a blade receptacle of a disposal position. A new microtome blade can then be pushed into the unoccupied blade receptacle of the sectioning position.

DE 10 2013 106 023 A1 discloses a system and a method for producing precision tissue specimens, a specimen slide and/or a precision tissue specimen applied onto such a specimen slide being automatically and uniquely associated with a specimen container and/or with a tissue specimen taken out of such a specimen container.

SUMMARY

The object of the present disclosure is to describe a microtome that increases the reliability of the process sequence in the context of processing of histological samples.

The object is achieved by a microtome that is characterized in that an optically readable image pattern is applied onto the microtome blade; and that an optical reading apparatus is present which reads the image pattern off the microtome blade, generates analog or digital image signals with regard to the read-off image pattern, and conveys the image signals to a control apparatus of the microtome.

What has been recognized according to the present disclosure is that different microtome blades, for example microtome blades of different manufacturers or microtome blades that have been manufactured using different production processes, have very different properties. It can be the case in particular, for example, that microtome blades of a first manufacturer are usable particularly effectively in a specific microtome, whereas using microtome blades of another manufacturer with that microtome does not produce good sectioning results. It can happen in particular, disadvantageously, that the sections are not clean, holes or fine cracks occur in the thin sections, knife tracks and/or chatter marks are visible in the thin sections, or crimps occur within the thin sections. This can be attributable, for example, to the fact that the microtome blades of different manufacturers or of different product series are produced from different materials or mixtures of materials, and/or using different production methods.

A very particular difficulty in this context is that generally speaking, the user cannot directly view the microtome blades being used in order to see whether good sectioning results are achievable in combination with the microtome that he or she is using. It can be the case in particular, disadvantageously, that thin sections of insufficiently good quality are produced in large quantities but the laboratory technician does not immediately notice the inadequacy of the microtome blades. It is thus only upon subsequent microscopic investigation (after laborious staining of the thin sections) that it becomes apparent that the thin sections are faulty; in most cases it is not immediately evident whether the inadequacy is attributable to the use of an unsuitable microtome blade or, for example, to operating errors by the laboratory technician.

The microtome according to the present disclosure has the very particular advantage that by means of the optical reading apparatus it is possible to determine beforehand whether or not thin sections of good quality can be produced with the microtome blade that is currently intended to be used. For that purpose, the microtome reads off from the particular microtome blade that is intended to be used, by means of the optical reading apparatus, an image pattern that, for example, can be or contain a manufacturer's logo or product logo, and conveys to a control apparatus corresponding analog or digital image signals regarding the read-off image pattern.

If the control apparatus ascertains, for example, after an evaluation of the received image signals, that the microtome blade is to be associated with a specific manufacturer and/or with a specific product series, in the next step it can, for example, specify whether and/or with what sectioning parameters a sectioning operation is to occur. It is advantageous for this purpose if the relevant data regarding the microtome blades of different manufacturers or of different product series are stored in a memory apparatus of the control apparatus. In particular, an association between different image patterns and the information as to whether a microtome blade is usable with the microtome in terms of sufficiently high-quality sectioning results can advantageously be stored in a memory device of the control apparatus. It is advantageously also possible, in particular, for an association between properties of a microtome blade, such as a type of knife and/or type of grind, and the image pattern thereof, to be stored in the memory device.

It is possible in particular for the control apparatus to ascertain if thin sections of sufficient quality cannot be produced, in combination with the microtome, using a microtome blade from which an image pattern has just been read. In such a case, for example, utilization of the microtome blade can be disallowed and/or a warning can be outputted to the user of the microtome. Provision can be made, for example, that the control apparatus inhibits the sectioning apparatus and/or an, in particular automatic, microtome blade changing apparatus.

In such a case provision can also alternatively be made that the sectioning apparatus and/or the microtome blade changing apparatus is enabled only after output of a warning message and after confirmation by the laboratory technician that a sectioning operation is nevertheless desired. The procedure can also be correspondingly similar, as a precaution, if a microtome blade does not comprise an image pattern that is detectable by the optical reading apparatus or if a detected image pattern cannot be associated with a manufacturer or with a product series.

Very generally, provision can advantageously be made that the control apparatus evaluates the received image signals and specifies at least one treatment step depending on the evaluation result.

The specification of the at least one treatment step is not necessarily conclusive. For example, the control apparatus can firstly specify as a treatment step that an input of the user is required. After the input is received and depending on the user's decision, the control apparatus can then specify further treatment steps.

The request for an input from a user can be made, in particular, when the microtome blade that is to be used is one that is not compatible with the microtome, or if a microtome blade does not comprise an image pattern detectable by the optical reading apparatus, or if a manufacturer and/or a product series cannot be associated with a detected image pattern in the context of the evaluation.

The request for an input from a user and/or the output of a warning message to the user can also be made in particular when the control apparatus ascertains that the current sectioning parameters of the microtome, for example in terms of sectioning angle and/or sectioning speed, or the properties of the sample that is to be sectioned using the microtome blade whose image pattern has been read off, will not produce good sectioning results. The "sectioning angle" is the angle between the direction of the plane of the microtome blade and the sectioning direction.

The microtome can comprise a button or a keypad and/or another input apparatus by means of which the user can make an input. Alternatively or additionally, it is also possible for the input to be inputted via a computer to which the microtome is connected directly or via a network. The control apparatus evaluates the input and can then, depending on the content of the input, delete a treatment step that has already been specified and/or specify at least one further treatment step. For example, the control apparatus can delete the originally provided treatment step according to which the sectioning apparatus is to be inhibited, if the user's input is that a sectioning operation is to occur, despite the warning, using the incompatible microtome blade.

In a very particularly advantageous embodiment, the control apparatus can stop a microtome blade change until the input arrives.

As already mentioned, it is possible for one of the treatment steps to include outputting a message to a user. For example, the microtome according to the present disclosure can be configured in such a way that the control apparatus outputs the message that everything is OK and a correct sectioning operation can occur, if the control apparatus has recognized the microtome blade and has ascertained that high-quality thin sections can be manufactured.

Analogously, it is also possible for a warning message to be outputted if the control apparatus has recognized that thin sections of sufficiently good quality cannot be produced, or if the control apparatus was unable to associate the detected image pattern with a manufacturer and/or with a product series in the context of evaluation.

In particular, a treatment step specified by the control apparatus can encompass permitting the execution of sectioning operations using the microtome blade whose image pattern has been read off and evaluated. The control apparatus specifies this treatment step, for example, when it has been able to associate the image pattern read off from the microtome blade with a specific manufacturer, and/or with a specific product series, for which the control apparatus has the information that good-quality thin sections can be produced in combination with the microtome.

For this purpose in particular, an association between different image patterns and the information as to whether or not a thin section of sufficient quality is possible can be stored in a memory device of the control apparatus.

Alternatively or additionally, provision can also be made that the association that is stored in a memory apparatus of the control apparatus contains even more-detailed information, for example information regarding at least one necessary sectioning parameter. The sectioning parameter can relate, for example, to the sectioning angle and/or to the sectioning speed.

In a particularly flexibly usable embodiment of the microtome according to the present disclosure, the control apparatus individually adapts at least one sectioning parameter of the microtome to the sectioning parameter(s) ascertained to be necessary.

The optical reading apparatus can be embodied, for example, as a camera, in particular as a CCD camera.

The microtome preferably comprises a microtome blade holder in which a microtome blade is releasably fastenable in a sectioning position. In an advantageous embodiment, the optical reading apparatus is embodied and arranged to read off an image pattern from a microtome blade arranged in the microtome blade holder. In particular, the optical reading apparatus can be integrated into the microtome blade holder.

In a very particularly advantageous embodiment, the microtome comprises a microtome blade supply container in which several microtome blades are stocked. Replacements are thereby always available when the microtome blade currently in use has worn out. In this embodiment, the optical reading apparatus can be embodied and arranged to read off an image pattern from a microtome blade arranged in the microtome blade supply container.

Alternatively or additionally, the microtome can comprise a microtome blade changing apparatus that is embodied to, in particular automatically, remove a microtome blade from the microtome blade supply container and transport it to the microtome blade holder. Provision can advantageously be made in particular that the optical reading apparatus reads off the image pattern from a microtome blade during transport to the microtome blade holder. This has the particular advantage that the reading of the image pattern can occur in chronologically parasitic fashion, so that the overall process sequence does not become slowed down. The optical reading apparatus can in particular be integrated into the microtome blade changing apparatus.

In a very particularly advantageous embodiment, the control apparatus keeps a log. In particular, provision can advantageously be made that for each individual microtome blade, a log is kept as to whether it was possible to read off an image pattern and/or whether it was possible to evaluate a read-off image pattern and/or whether it was possible to associate a read-off image pattern with a manufacturer or with a product series. The log can, in particular, contain the image pattern as such and/or data with regard to the microtome blade. The log can furthermore contain information regarding the point in time at which the microtome blade was used and/or regarding each sample sectioned and/or regarding an associated patient and/or regarding the point in time at which the microtome blade was manufactured and/or the batch number of the microtome blade and/or a numerical or alphanumeric sequential number on the microtome blade and/or the warning messages that have occurred.

The control apparatus preferably continuously saves the log data in a memory and/or outputs the log data via an interface. It is also possible, alternatively or additionally, for the control apparatus to display, in particular continuously display, the log data on an output apparatus, for example a display of the microtome.

In a very particularly advantageous embodiment, the log data are conveyed to a higher-level computer where they are stored and/or further processed.

In particular, and in accordance with an independent inventive idea, provision can advantageously be made that the higher-level computer receives further log data of other microtomes and/or of other laboratory devices and stores and/or further processes that data in particular together with the log data of the microtome. Very generally and in accordance with the independent inventive idea, a histology laboratory system that comprises a higher-level computer that receives, stores, and/or further processes log data from a microtome according to the present disclosure, and/or further log data from other laboratory devices, is particularly advantageous.

The log data and the further log data that relate to the same sample are preferably associated with one another, and stored and/or further processed together, by the higher-level computer. It thereby becomes possible in particular for a higher-level log, which contains the log data transmitted from the microtome and the further log data of other microtomes and/or of other laboratory devices, to be created, in particular in sample-specific fashion. The higher-level log can preferably contain data regarding all process steps in the context of processing of a sample in a histology laboratory. The higher-level log can in that regard contain, in particular, log data and further log data that encompass the processing of a sample from the trimming station to diagnosis by means of a microscope. It is also possible, however, for the higher-level log to contain log data and further log data of a portion of such a processing sequence.

In the context of a variant, logging occurs only and exclusively in cases recognized to be problematic, for example because it was not possible to read off an image pattern or because it was found, after evaluation, that a thin section of sufficiently good quality cannot be made using the microtome blade whose image pattern was read off.

In particular, one of the treatment steps can encompass storing the image signals of the read-off image pattern and/or storing information, ascertained by the control apparatus, regarding the microtome blade. This can be accomplished in particular in such a way that the corresponding data are stored in the log already mentioned above.

In a very particularly advantageous embodiment, the control apparatus compares the image signals received from the optical reading apparatus with the image signals of at least one reference image pattern. A memory apparatus, in which image signals of at least one reference image pattern are stored or storable, can be present for that purpose. The control apparatus can retrieve the reference image patterns individually from the memory apparatus and compare them with the image signals received from the optical reading apparatus.

The optical reading apparatus can in particular be embodied and arranged to read off an image pattern embodied as a barcode or as a QR code or as a logo or as lettering. The lettering can be embodied as a sequential alphanumeric or numerical number. There are no restrictions in principle regarding the type of image pattern that can be read off.

In a very particularly advantageous embodiment, it is in particular not necessary for the image pattern always to be arranged at the same location on the microtome blades. Instead, with this embodiment the entire microtome blade is always detected using the optical reading apparatus in order to ascertain the location of an image pattern that can be evaluated.

The microtome according to the present disclosure can be embodied in particular as a sliding microtome or as a rotary microtome or as a vibratome or as a saw microtome.

A microtome blade, in particular for a microtome according to the present disclosure, onto which an optically readable image pattern is applied, is very particularly advantageous. The image pattern can be, for example, printed on. It is alternatively also possible, for example, for the image pattern to be engraved, in particular by means of a laser, or applied by an etching method.

The image pattern preferably contains information regarding a point in time at which the microtome blade was manufactured and/or regarding the manufacturer and/or regarding the type of knife and/or regarding the type of grind and/or regarding the microtome blade size. The image pattern can contain, for example, a manufacturer's logo or product logo, and/or a sequential number that is embodied numerically or alphanumerically. By way of that number it is possible, for example, to determine the time of manufacture, location of manufacture, and the equipment used for production of the microtome blade.

Very generally, a method for operating a microtome is particularly advantageous, the method encompassing reading off an optically readable image pattern applied onto the microtome blade and generating analog or digital image signals regarding the read-off image pattern which are then conveyed, in particular for evaluation, to a control apparatus of the microtome. As already explained above, the method can in particular encompass ascertaining whether or not thin sections of good quality can be produced with the microtome blade that is currently intended to be used.

BRIEF DESCRIPTION OF THE DRAWING VIEWS

The subject matter of the disclosure is depicted in the drawings schematically and by way of example, and will be described below with reference to the Figures; elements that are identical or function identically, even in different exemplifying embodiments, are usually labeled with the same reference characters. In the drawings.

DETAILED DESCRIPTION

Figure 1:
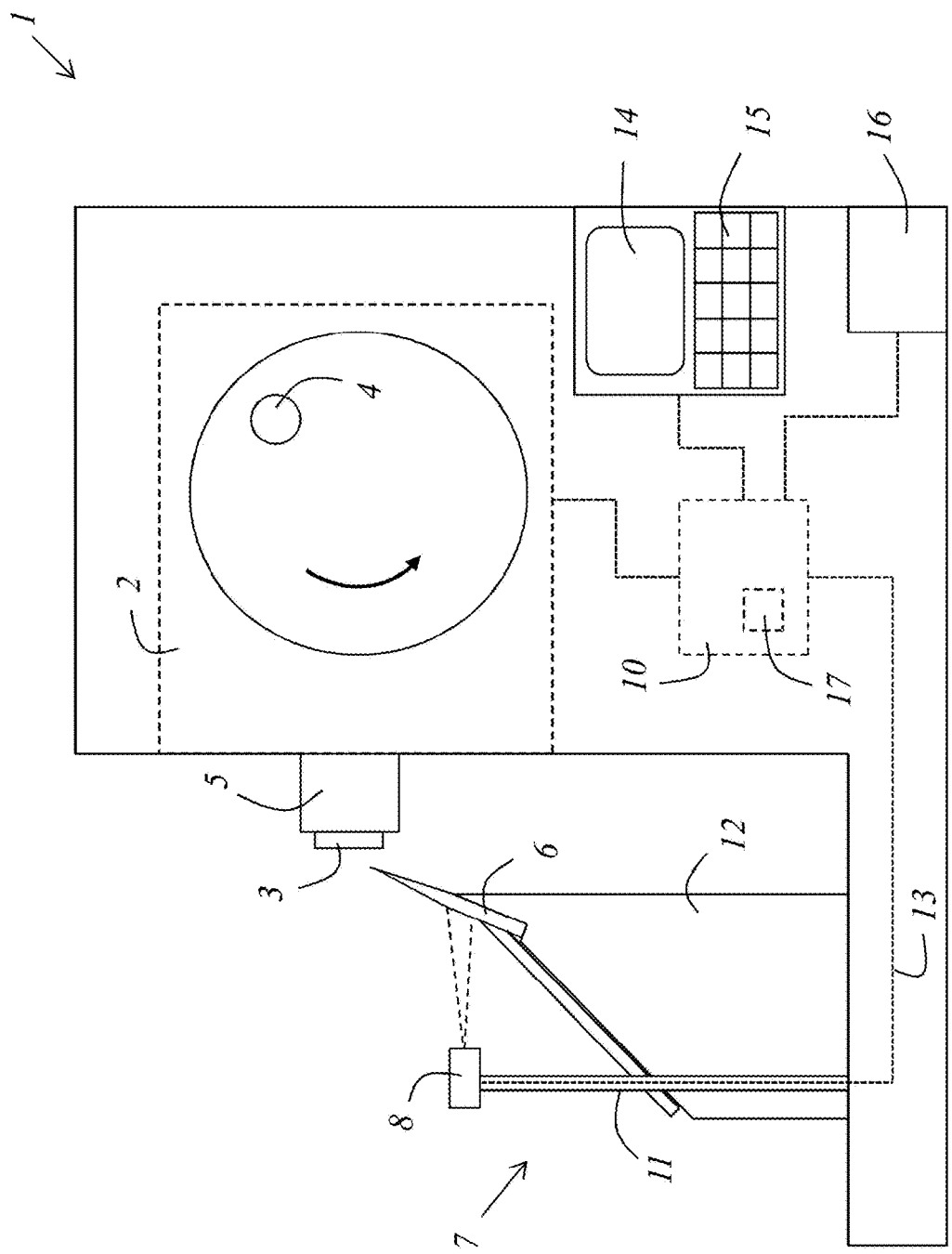
FIG. 1 shows a first exemplifying embodiment of a microtome according to the present disclosure.

FIG. 1 shows a first exemplifying embodiment of a microtome 1 according to the present disclosure. Microtome 1 comprises a sectioning apparatus 2 for sectioning histological samples 3 into thin prepared sections. The sectioning apparatus is operated with a hand crank 4 and comprises a sample holder 5 that, in the context of a sectioning operation, moves relative to a microtome blade 6 that is fastened in a microtome blade holder 7.

Microtome 1 comprises an optical reading apparatus 8 that is integrated into microtome blade holder 7 and reads off an image pattern 9 (not visible in this Figure) from microtome blade 6.

Optical reading apparatus 8 generates analog or digital image signals with regard to the read-off image pattern 9, and conveys the image signals to a control apparatus 10 of the microtome. Optical reading apparatus 8 is secured laterally by means of a tubular mount 11 that is fastened laterally on a console 12 of microtome blade holder 7. A data cable 13, which connects optical reading apparatus 8 to control apparatus 10, proceeds through tubular mount 11.

Microtome 1 furthermore comprises a display 14 by means of which messages can be outputted to a user. In particular, display 14 can also serve to request from a user inputs that the user can input via an input apparatus 15 that can be, for example, a keypad. Display 14 can also serve, for example, to continuously display information regarding image pattern 9 detected by means of the optical reading apparatus, and/or evaluation results with regard to the read-off image pattern.

Microtome 1 comprises an interface 16 for connection to a computer network or for direct connection to a computer.

Control apparatus 10 comprises a memory apparatus 17 in which image signals of reference image patterns can be stored; and/or in which information regarding the optically read-off image patterns 9, and/or regarding the evaluation results, and/or regarding microtome blade 6; and/or data with regard to the respectively read-off image pattern 9 and/or with regard to the treatment steps that are to be or have been performed, can be stored. In particular, a log that can be forwarded via interface 16 to a connected computer, and/or can be presented on display 14, can advantageously be stored in memory apparatus 17.

Microtome 1 ascertains beforehand whether or not thin sections of good quality can be produced using microtome blade 6 which is currently intended to be used and whose image pattern 9 has been read off. If control apparatus 10 ascertains, after an evaluation of the received image signals, that microtome blade 6 is to be associated with a specific manufacturer and/or with a specific product series, it ascertains in the next step, for example, whether and/or with what sectioning parameters a sectioning operation is to occur.

The relevant data regarding microtome blades 6 of different manufacturers or of different product series are stored for that purpose in memory apparatus 17 of control apparatus 10. Also stored in memory device 17 is an association between different image patterns 9 and the information as to whether a microtome blade 6 is usable with microtome 1 in terms of sectioning results of sufficiently good quality.

If the control apparatus ascertains that thin sections of sufficient quality cannot be produced with microtome 1 using microtome blade 6 from which an image pattern 9 has just been read off, utilization of microtome blade 6 is disallowed and/or a warning is issued to the user of microtome 1. Microtome 1 can be preset in such a way that control apparatus 10 inhibits sectioning apparatus 2. Provision is made in such a case that sectioning apparatus 2 is enabled only after output of a warning message and after a confirmation by the laboratory technician that a sectioning operation is still desired. A corresponding procedure is used if a microtome blade 6 does not have an image pattern 9 detectable by optical reading apparatus 8, or if a manufacturer and/or a product series cannot be associated with a detected image pattern.

If control apparatus 10 ascertains, conversely, that thin sections of sufficient quality can be produced in combination with microtome 1 using microtome blade 6 from which an image pattern 9 has just been read off, it then enables sectioning apparatus 2.

Figure 2:
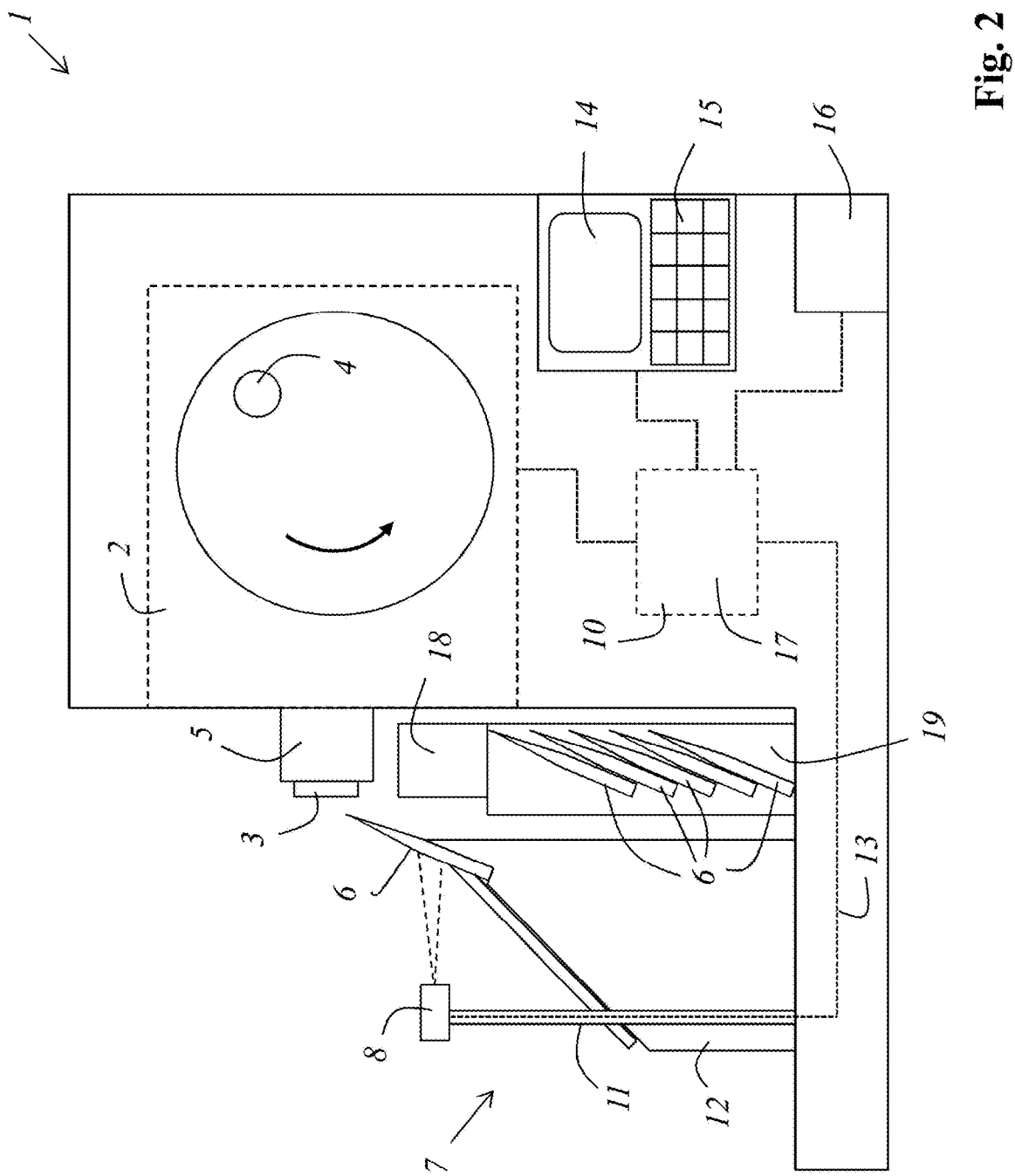
FIG. 2 shows a second exemplifying embodiment of a microtome according to the present disclosure.

FIG. 2 very schematically shows a second exemplifying embodiment of a microtome 1 according to the present disclosure which is constructed substantially in exactly the same way as microtome 1 depicted in FIG. 1. Microtome 1 depicted in FIG. 2 additionally comprises, however, a microtome blade changing apparatus 18 that removes a microtome blade 6 from a microtome blade supply container 19 in which several microtome blades 6 are stocked, and transports it to microtome blade holder 7 when the microtome blade 6 in microtome blade holder 7 needs to be replaced.

Figure 3:
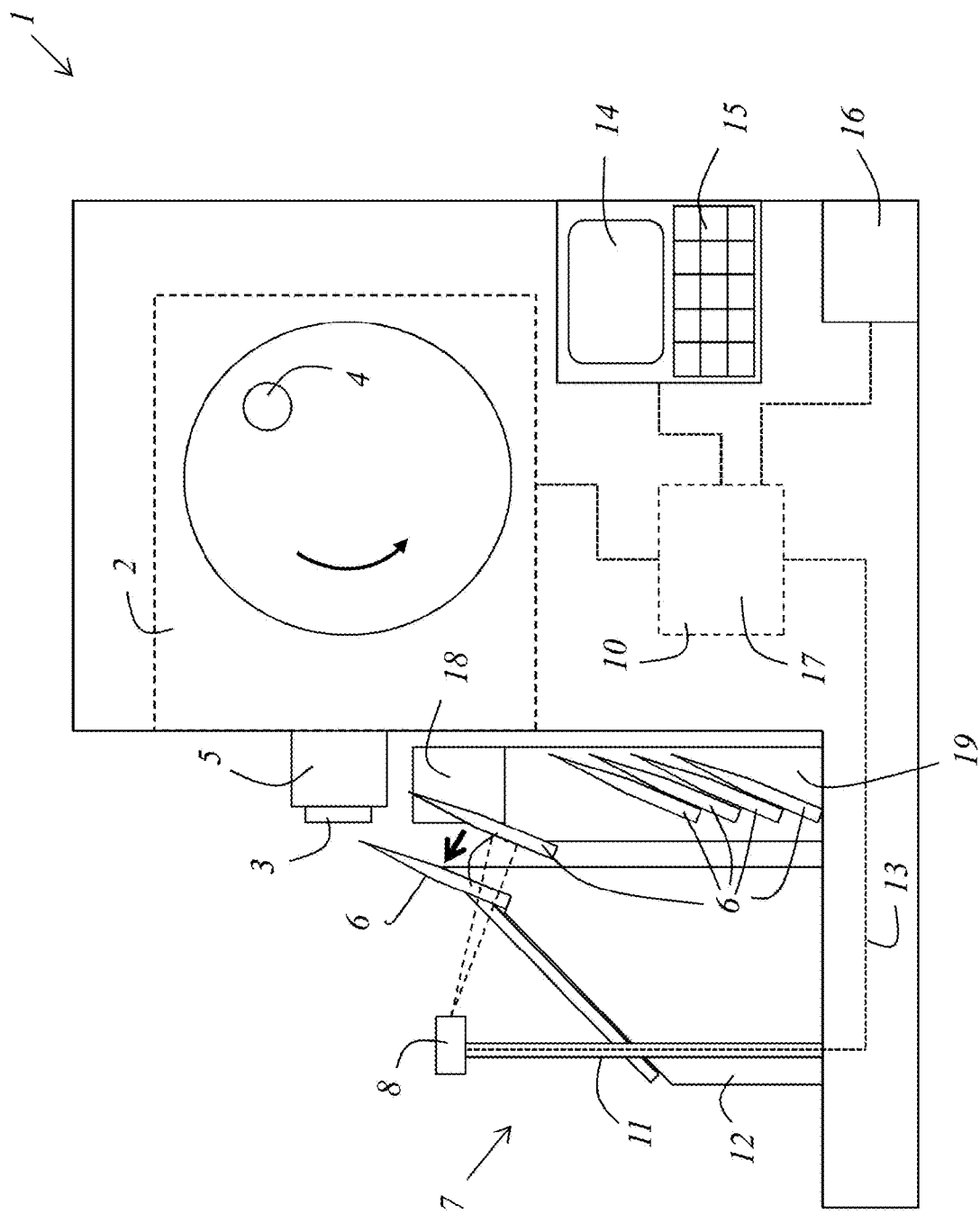
FIG. 3 shows a third exemplifying embodiment of a microtome according to the present disclosure.

FIG. 3 very schematically shows a third exemplifying embodiment of a microtome 1 according to the present disclosure which is constructed substantially in exactly the same way as microtome 1 depicted in FIG. 2.

Microtome 1 depicted in FIG. 3 also comprises a microtome blade changing apparatus 18 that removes a microtome blade 6 from a microtome blade supply container 19 in which several microtome blades 6 are stocked, and transports it to microtome blade holder 7 when the microtome blade 6 in microtome blade holder 7 needs be replaced. Provision is made here that optical reading apparatus 8 reads off image pattern 9 from a microtome blade 6 during transport to microtome blade holder 7.

Figure 4:
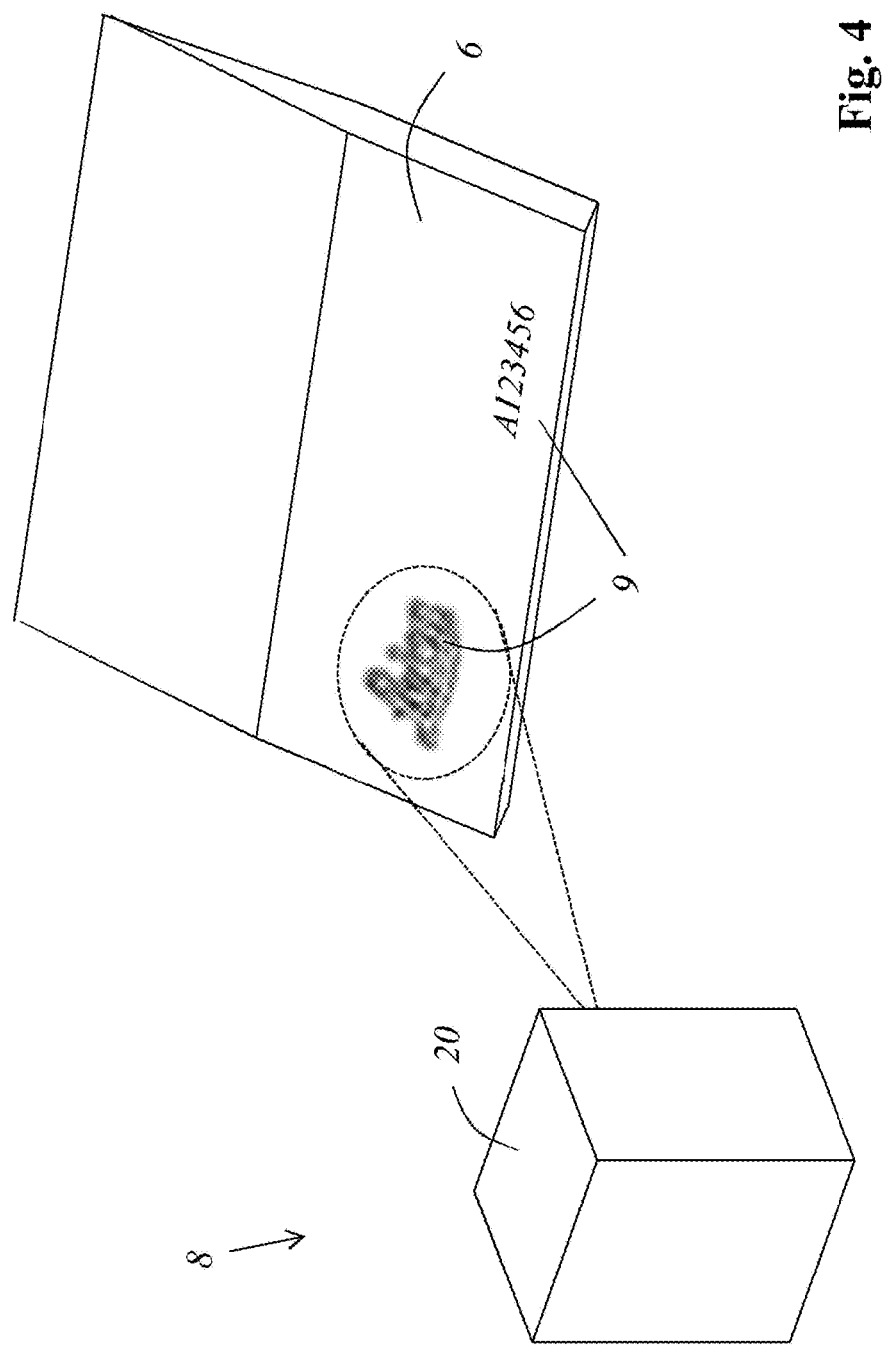
FIG. 4 shows a detail of a fourth exemplifying embodiment of a microtome according to the present disclosure together with a microtome blade according to the present disclosure.

FIG. 4 shows a detail of a fourth exemplifying embodiment of a microtome 1 according to the present disclosure, namely an optical reading apparatus 8, embodied as a camera 20, which is currently reading off an image pattern 9 from a microtome blade 6 according to the present disclosure. Optical reading apparatus 8 can in particular be embodied and arranged to read off an image pattern 9 embodied as a barcode or as a QR code or as a logo or as lettering, and/or as a sequential number.

PARTS LIST

1 Microtome
2 Sectioning apparatus
3 Sample
4 Hand crank
5 Sample holder
6 Microtome blade
7 Microtome blade holder
8 Optical reading apparatus
9 Image pattern
10 Control apparatus
11 Mount
12 Console
13 Data cable
14 Display
15 Input apparatus
16 Interface
17 Memory apparatus
18 Microtome blade changing apparatus
19 Microtome blade supply container
20 Camera

What is claimed is:

1. A microtome (1) comprising:
a sectioning apparatus (2) including a microtome blade (6) for sectioning histological samples (3) into thin prepared sections;
a control apparatus (10);
an optically readable image pattern (9) applied onto the microtome blade (6); and
an optical reading apparatus (8) operable to read the image pattern (9) on the microtome blade (6), generate analog or digital image signals corresponding to the read image pattern (9), and convey the image signals to the control apparatus (10);
wherein the control apparatus (10) receives the image signals conveyed thereto.

2. The microtome (1) according to claim 1, further comprising a microtome blade holder (7) in which the microtome blade (6) is releasably fastenable in a sectioning position.

3. The microtome (1) according to claim 2, wherein the optical reading apparatus (8) is arranged to read the image pattern (9) on the microtome blade (6) when the microtome blade (6) is in the microtome blade holder (7).

4. The microtome (1) according to claim 2, wherein the optical reading apparatus (8) is integrated into the microtome blade holder (7).

5. The microtome (1) according to claim 2, further comprising a microtome blade supply container (19) in which the microtome blade (6) is stored when the microtome blade (6) is not in the sectioning position.

6. The microtome (1) according to claim 5, wherein the optical reading apparatus (8) is arranged to read the image pattern (9) on the microtome blade (6) when the microtome blade (6) is in the microtome blade supply container (19).

7. The microtome (1) according to claim 5, further comprising a microtome blade changing apparatus (18) operable to remove the microtome blade (6) from the microtome blade supply container (19) and transport the microtome blade (6) to the microtome blade holder (7).

8. The microtome (1) according to claim 7, wherein the optical reading apparatus (8) reads the image pattern (9) on the microtome blade (6) during transport of the microtome blade (6) to the microtome blade holder (7).

9. The microtome (1) according to claim 7, wherein the optical reading apparatus (8) is integrated into the microtome blade changing apparatus (18).

10. The microtome (1) according to claim 1, wherein the control apparatus (10) is configured to evaluate the received image signals and specify at least one treatment step depending on an evaluation result from the evaluation.

11. The microtome (1) according to claim 10, wherein
a. the at least one treatment step includes inhibiting the sectioning apparatus (2); or
b. the at least one treatment step includes inhibiting or stopping a microtome blade change.

12. The microtome (1) according to claim 10, wherein the at least one treatment step includes enabling the sectioning apparatus (2) for at least one sectioning operation.

13. The microtome (1) according to claim 10, wherein the at least one treatment step includes requesting an input from a user.

14. The microtome (1) according to claim 13, wherein the control apparatus (10) is configured to receive the requested input from the user, evaluate the input, and depending on the input, delete a treatment step that has already been specified and/or specify at least one further treatment step.

15. The microtome (1) according to claim 13, wherein the control apparatus (10) is configured to inhibit the sectioning apparatus (2) until the requested input is received; or the control apparatus (10) is configured to stop a microtome blade change until the requested input is received.

16. The microtome (1) according to claim 10, wherein the at least one treatment step includes outputting a message to a user.

17. The microtome (1) according to claim 10, wherein the at least one treatment step includes discarding the microtome blade (6) from which the image pattern (9) has been read.

18. The microtome (1) according to claim 10, wherein the at least one treatment step includes storing the image signals of the read image pattern (9) and/or storing information ascertained by the control apparatus (10) regarding the microtome blade (6).

19. The microtome (1) according to claim 10, wherein to evaluate the received image signals, the control apparatus (10) compares the received image signals from the optical reading apparatus (8) with image signals of at least one reference image pattern.

20. The microtome (1) according to claim 19, further comprising a memory apparatus in which the image signals of at least one reference image pattern are stored.

21. The microtome (1) according to claim 1, wherein the control apparatus (10) is configured to ascertain whether or not the microtome blade (6) is usable with the microtome (1) based on the received image signals.

22. The microtome (1) according to claim 21, wherein the control apparatus (10) includes a memory apparatus (17) storing information associated with different respective image patterns (9), wherein the stored information includes whether or not a microtome blade (6) having the respective image pattern (9) is usable with the microtome (1).

23. The microtome (1) according to claim 1, wherein the control apparatus (10) is configured to specify, depending on the image signals of the read image pattern (9), at least one sectioning parameter to be set.

24. The microtome (1) according to claim 1, wherein optically readable image pattern (9) is embodied as a barcode or as a QR code or as a logo or as lettering or as a sequential number.

25. The microtome (1) according to claim 1, wherein the microtome (1) is a sliding microtome or a rotary microtome or a vibratome or a saw microtome.

26. The microtome (1) according to claim 1, wherein the control apparatus (10) is configured to continuously keep a log.

27. The microtome (1) according to claim 26, wherein the control apparatus (10) saves log data in a memory and/or outputs log data via an interface and/or displays log data on an output apparatus.

28. The microtome (1) according to claim 27, wherein the log data includes treatment steps and/or user inputs and/or data of the reading device (8) and/or data of the control apparatus (10) and/or location data and/or time data.

29. A histology laboratory system comprising a microtome (1) according to claim 1 and a computer that receives log data from the microtome (1).

30. The histology laboratory system according to claim 29, wherein
   a. the computer receives further log data of other microtomes and/or of other laboratory devices; or
   b. the computer receives further log data of other microtomes and/or of other laboratory devices and respectively associates the log data and the further log data that relate to the same sample with one another, and stores and/or further processes the associated log data and further log data together.

31. A microtome blade (6) for use in a microtome (1) according to claim 1, wherein the microtome blade (6) has an optically readable image pattern (9) applied thereto.

32. The microtome blade (6) according to claim 31, wherein the image pattern (9) is imprinted or engraved or applied using an etching process.

33. The microtome blade (6) according to claim 31, wherein the image pattern (9) includes information regarding a point in time of manufacture of the microtome blade (6) and/or equipment used in producing the microtome blade (6), and/or regarding a manufacturer of the microtome blade (6) and/or regarding a type of knife of the microtome blade (6) and/or regarding a type of grind of the microtome blade (6) and/or regarding a size of the microtome blade (6).

34. The microtome blade (6) according to claim 31, wherein the microtome blade (6) is a disposable blade.

\* \* \* \* \*